(12) United States Patent
Vögtle et al.

(10) Patent No.: US 12,337,691 B2
(45) Date of Patent: Jun. 24, 2025

(54) TORQUE TRANSMISSION UNIT, DRIVE TRAIN AND METHOD FOR OPERATING A TORQUE TRANSMISSION UNIT

(71) Applicant: Schaeffler Technologies AG & Co. KG, Herzogenaurach (DE)

(72) Inventors: Benjamin Vögtle, Weingarten (DE); Stephan Maienschein, Baden-Baden (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 639 days.

(21) Appl. No.: 17/770,662

(22) PCT Filed: Jul. 23, 2020

(86) PCT No.: PCT/DE2020/100654
§ 371 (c)(1),
(2) Date: Apr. 21, 2022

(87) PCT Pub. No.: WO2021/078320
PCT Pub. Date: Apr. 29, 2021

(65) Prior Publication Data
US 2022/0379709 A1    Dec. 1, 2022

(30) Foreign Application Priority Data
Oct. 23, 2019   (DE) ............... 10 2019 128 609.3

(51) Int. Cl.
*B60K 6/383* (2007.10)
*B60K 6/387* (2007.10)
(Continued)

(52) U.S. Cl.
CPC .............. *B60K 6/387* (2013.01); *B60K 6/383* (2013.01); *B60K 6/40* (2013.01); *F16H 45/02* (2013.01);
(Continued)

(58) Field of Classification Search
CPC .......... B60K 6/387; B60K 6/383; B60K 6/40; B60K 6/442; F16H 45/02;
(Continued)

(56) References Cited

U.S. PATENT DOCUMENTS 6,289,674 B1   9/2001 Halene et al.
7,077,253 B2*  7/2006 Maienschein ........... F16H 45/02
                                                          192/3.3

(Continued)

FOREIGN PATENT DOCUMENTS

CN   102906459 A   1/2013
CN   107599822 A   1/2018
(Continued)

*Primary Examiner* — Steve Clemmons

(57) ABSTRACT

A torque transmission unit includes a first input side, a second input side, an output side, a hydrodynamic converter and a lock-up clutch. The first input side is configured to receive a first torque, and the second input side is configured to receive a second torque. The torque transmission unit has a freewheel. The freewheel is arranged downstream of the hydrodynamic converter, and the second input side is arranged downstream of the freewheel in a torque flow of the first torque from the first input side to the output side. The freewheel is designed to, in a first freewheel operating state, connect, in a torque-locking manner, the hydrodynamic converter to the output side for the transmission of the first torque from the first input side to the output side when the lock-up clutch is open. The freewheel is designed to, in a second freewheel operating state, decouple the hydrodynamic converter from the output side, to at least partially prevent a transmission of the second torque from the second input side into the hydrodynamic converter.

13 Claims, 2 Drawing Sheets

US 12,337,691 B2

Page 2

(51) Int. Cl.
*B60K 6/40* (2007.10)
*F16H 45/02* (2006.01)
*B60K 6/442* (2007.10)
*F16H 45/00* (2006.01)

(52) U.S. Cl.
CPC ........... *B60K 6/442* (2013.01); *B60Y 2200/92* (2013.01); *F16H 2045/005* (2013.01); *F16H 2045/0226* (2013.01); *F16H 2045/0252* (2013.01)

(58) Field of Classification Search
CPC ....... F16H 2045/005; F16H 2045/0221; F16H 2045/0252; F16H 2045/0247
See application file for complete search history.

(56) References Cited

U.S. PATENT DOCUMENTS

| | | | | |
|---|---|---|---|---|
| 8,444,519 | B2* | 5/2013 | Borntraeger | B60K 6/26 475/5 |
| 9,285,024 | B2* | 3/2016 | Kombowski | F16H 45/02 |
| 9,709,125 | B2* | 7/2017 | Guellueck | F16F 15/13128 |
| 9,995,366 | B2* | 6/2018 | Li | F16F 15/12306 |
| 10,017,044 | B2* | 7/2018 | Lahr | B60K 6/50 |
| 10,513,171 | B2* | 12/2019 | Mehlis | B60K 17/26 |
| 10,663,050 | B2* | 5/2020 | Maienschein | F16F 15/145 |
| 10,760,624 | B1* | 9/2020 | Samie | F16H 41/04 |
| 10,876,582 | B2* | 12/2020 | Lahr | F16D 41/16 |
| 11,009,124 | B2* | 5/2021 | Li | F16D 7/048 |
| 2006/0207851 | A1 | 9/2006 | Friedrichshafen | |
| 2008/0072586 | A1* | 3/2008 | Hammond | B60K 6/485 60/330 |
| 2009/0139821 | A1 | 6/2009 | Koppitz et al. | |
| 2010/0087290 | A1 | 4/2010 | Schoenek et al. | |
| 2010/0242466 | A1* | 9/2010 | Krause | F16F 15/167 60/338 |
| 2011/0192692 | A1* | 8/2011 | Werner | F16F 15/145 192/3.29 |
| 2013/0068580 | A1* | 3/2013 | Doegel | F16H 47/08 192/3.28 |
| 2016/0348779 | A1* | 12/2016 | Voegtle | F16F 15/145 |

FOREIGN PATENT DOCUMENTS

| | | |
|---|---|---|
| DE | 102008026426 A1 | 12/2008 |
| DE | 102015201457 A1 | 7/2016 |
| JP | 2017053466 A * | 3/2017 |

* cited by examiner

TORQUE TRANSMISSION UNIT, DRIVE TRAIN AND METHOD FOR OPERATING A TORQUE TRANSMISSION UNIT

CROSS-REFERENCE TO RELATED APPLICATIONS

This application is the U.S. National Phase of PCT Appln. No. PCT/DE2020/100654 filed Jul. 23, 2020, which claims priority to DE 102019128609.3 filed Oct. 23, 2019, the entire disclosures of which are incorporated by reference herein.

TECHNICAL FIELD

The disclosure relates to a torque transmission unit, a drive train and a method for operating such a torque transmission unit.

BACKGROUND

From DE 10 2008 026 426 A1, a hydrodynamic coupling unit for a hybrid vehicle is known.

SUMMARY

It is desirable to provide an improved torque transmission unit, an improved drive train and an improved method for operating such a torque transmission unit.

An improved torque transmission unit can be provided in that the torque transmission unit has a first input side mounted rotatably about an axis of rotation, a second input side, an output side, a hydrodynamic converter and a lock-up clutch. The first input side can be connected to an internal combustion engine in a torque-locking manner, and a first torque can be introduced into the first input side. The second input side can be connected to an electric machine in a torque-locking manner, and a second torque can be introduced into the second input side. The output side can be connected to a transmission unit in a torque-locking manner. The lock-up clutch is arranged in parallel with the hydrodynamic converter. The torque transmission unit also has a freewheel. The freewheel is downstream of the hydrodynamic converter, and the second input side is downstream of the freewheel in a torque flow of the first torque from the first input side to the output side. The freewheel can be operated in a first freewheel operating state or in a second freewheel operating state. To transmit the first torque from the first input side to the output side when the lock-up clutch is open, the freewheel is designed for the hydrodynamic converter to be connected to the output side in a torque-locking manner in the first freewheel operating state of the freewheel. Furthermore, to at least partially prevent a torque transmission of the second torque from the second input side into the hydrodynamic converter, the freewheel is designed to decouple the hydrodynamic converter from the output side in the second freewheel operating state.

An advantage according to one example embodiment of the disclosure is that in converter operation, the first torque is reliably transmitted from the first input side to the output side, and a torque increase can also be achieved by converter operation on the output side compared to the input side. Furthermore, when the second torque is introduced into the torque transmission unit via the second input side, the turbine wheel is prevented from acting against the impeller, which reduces unnecessary losses in the hydrodynamic converter. Furthermore, wear of the converter is minimized because, when the turbine wheel pumps against the impeller, in which the turbine wheel acts as a pump and the impeller acts as a turbine, the impeller and/or the turbine wheel is unnecessarily worn due to cavitation effects that may occur in a converter fluid of the hydrodynamic converter. The torque transmission unit is particularly efficient and has a high level of efficiency in all operating states. Furthermore, thermal overheating of the converter fluid can be prevented. Furthermore, the uncoupling of the turbine wheel prevents only a small part of the second torque, which can be introduced into the torque transmission unit via the second input side, from being made available on the output side.

Advantageously, the first input side can be driven at a first speed about the axis of rotation, wherein the second input side can be driven at a second speed, wherein the first input side has a speed difference with respect to the second input side, wherein the freewheel is designed to be operated in the second freewheel operating state when the speed difference equals a predefined speed difference, and to be operated in the first freewheel operating state when speed difference exceeds the predefined speed difference. The predefined speed difference can be 0.

It is advantageous if the freewheel is closed in the first freewheel operating state. This can prevent the turbine wheel from rotating freely relative to the impeller and/or the freewheel, so that unnecessary bearing wear is prevented.

In a further embodiment, the freewheel is designed as a roller freewheel, clamp body-freewheel, wrap spring clutch or self-synchronizing clutch.

In a further embodiment, the hydrodynamic converter has the turbine wheel with a turbine flange, wherein the freewheel has an inner part arranged radially on the inside, an outer part arranged radially on the outside of the inner part and at least one blocking body. The inner part and the outer part define an annular gap in the radial direction, in which the blocking body is arranged at least in sections. The blocking body is designed to release the outer part relative to the inner part in the second freewheel operating state and for the inner part to be connected, in a torque-locking manner, to the outer part in the first freewheel operating state. The inner part is non-rotatably connected to the second input side and the outer part is non-rotatably connected to the turbine flange. This embodiment is particularly suitable for a particularly compact torque transmission with an integrated freewheel.

In a further embodiment, the torque transmission unit has an absorber device. The absorber device is arranged in the torque flow of the first torque between the lock-up clutch and the second input side and is designed to, at least partially, absorb a rotational non-uniformity of the first torque. The absorber device becomes active when the hydrodynamic converter is bypassed and the lock-up clutch is closed. When the lock-up clutch is open, the absorber device is essentially deactivated. The absorber device can be a torsion damper, for example, which is coupled directly into the torque flow. The absorber device can also have a centrifugal pendulum, wherein in this case only a pendulum flange of the centrifugal pendulum, to which a pendulum mass for pendulum travel is attached along an aerial tramway, is coupled into the torque flow between the lock-up clutch and the second input side.

An axially and radially compact torque transmission unit can be provided if the freewheel has a radial overlap with the absorber device at least in sections. Preferably, the freewheel is arranged radially on the inside of the absorber device.

It is also advantageous if the inner part is non-rotatably connected to a hub of the torque transmission unit, wherein the hub is designed to receive and provide torque transmission to a transmission input shaft of a transmission unit, wherein the absorber device has an input part, an output part and an energy storage element, wherein the input part can be rotated relative to the output part to counter the action of the energy storage element, wherein the output part is non-rotatably fixed on the hub.

An improved drive train for a motor vehicle can be provided in that the drive train has the torque transmission unit described above, an internal combustion engine, and an electric machine. The internal combustion engine is connected to the first input side in a torque-locking manner. The electric machine is connected to the second input side in a torque-locking manner. In an operating state of the powertrain, the internal combustion engine is deactivated. The electric machine provides the second torque on the second input side. The lock-up clutch is open. The freewheel is operated in the second freewheel operating state so that transmission of the second torque from the second input side into the hydrodynamic converter is essentially interrupted by the freewheel.

This embodiment has the advantage that in purely electrical operation of the drive train, i.e., when only the electric machine is activated and the internal combustion engine is deactivated, pumping operation of the turbine wheel in relation to the stationary impeller is prevented by operating the freewheel in the second freewheel operating state. As a result, the electric machine can be designed to be particularly small and inexpensive, and at the same time a vehicle user can be provided with the convenience of a hydrodynamic converter when the internal combustion engine is in operation.

In a further operating mode of the drive train, the internal combustion engine is activated and provides the first torque on the first input side. The electric machine provides the second torque on the second input side or is switched to generator operation or is deactivated. The freewheel is switched to the first freewheel operating state and the hydrodynamic converter is connected to the second input side in a torque-locking manner, so that the torque is transmitted via the hydrodynamic converter and the freewheel in the direction of the second input side from the first input side.

In a method for operating the torque transmission unit described above, the second torque is introduced into the torque transmission unit via the second input side, wherein the first input side is operated at a speed that differs from that of the second input side, wherein the lock-up clutch is open, wherein the speed difference is less than a predefined speed, wherein the freewheel is operated in the second freewheel operating state and at least partially interrupts a torque transmission of the second torque from the second input side to the hydrodynamic converter, wherein the second torque is essentially transmitted to the output side.

BRIEF DESCRIPTION OF THE DRAWINGS

The disclosure is explained in more detail below with reference to figures. In the figures.

DETAILED DESCRIPTION

Figure 1:
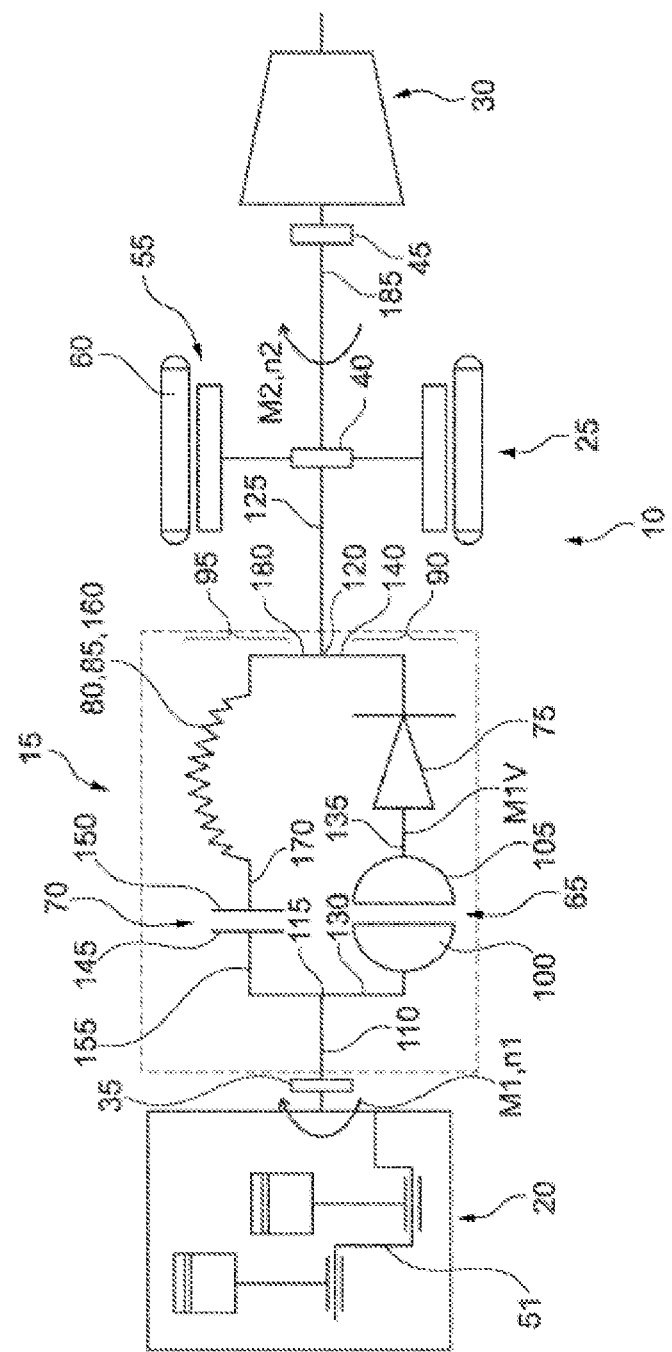
FIG. 1 shows a schematic representation of a drive train of a motor vehicle.

FIG. 1 shows a schematic representation of a drive train 10 of a motor vehicle.

The drive train 10 is embodied as a hybrid drive train, for example, and has a torque transmission unit 15, an internal combustion engine 20 embodied as the first drive motor, and an electric machine 25 embodied as the second drive motor. The internal combustion engine 20 can be designed as a reciprocating piston engine. Furthermore, the drive train can have a transmission unit 30. The transmission unit 30 can be designed as an automatic shifter or as a CVT transmission.

The torque transmission unit 15 has a first input side 35, a second input side 40, and an output side 45. Masses rotating about an axis of rotation 50 of the torque transmission unit 15 are shown symbolically in FIG. 1 by means of rectangles. A (rigid) torque transmission, for example, by means of shafts or flanges, is represented symbolically by solid lines.

The first input side 35 is rotationally fixed to a crankshaft 51 of the internal combustion engine 20. The internal combustion engine 20 is designed to provide a first torque M1 when activated. The internal combustion engine 20 is operated at a first speed n1.

The second input side 40 is non-rotatably connected to a rotor 55 of the electric machine 25. The rotor 55 is encompassed by a stator 60 which is arranged in a stationary manner in the drive train 10. The electric machine 25 can be designed as a brushless DC motor, for example. The stator 60 can have windings which, when activated, are energized in such a way that the rotor 55 provides a second torque M2. During operation, the rotor 55 rotates at a second speed n2.

The torque transmission unit 15 has a first torque transmission path 90 and a second torque transmission path 95.

The torque transmission unit 15 also has a hydrodynamic converter 65, a converter lock-up clutch 70, and a freewheel 75. In addition, the torque transmission unit 15 can have an absorber device 80, for example, a torsion damper 85.

In a torque flow of the first torque M1 from the first input side 35 to the output side 45, the torque transmission of the first torque M1 branches off at a first junction 115 into the first torque transmission path 90 and the second torque transmission path 95. The first junction 115 is non-rotatably connected to the first input side 35 by means of a first torque transmission 110 (shown as a solid line in FIG. 1).

The first torque-transmitting path 90 and the second torque-transmitting path 95 run in parallel from the first junction 115 and are combined at a second junction 120. The second junction 120 is non-rotatably connected to the second input side 40 by means of a second torque transmission 125.

For example, the hydrodynamic converter 65 and the freewheel 75 are arranged in the first torque transmission path 90. The lock-up clutch 70 and the absorber device 80, 85 are arranged in the second torque transmission path 95.

The hydrodynamic converter 65 has at least one impeller 100 and one turbine wheel 105. The impeller 100 is non-rotatably connected to the first junction 115 by means of a third torque transmission 130. On the output side, the turbine wheel 105 is connected to the freewheel 75 by means of a fourth torque transmission 135. On the output side (based on the torque transmission of the first torque from the first input side 35 to the output side 45), the freewheel 75 is non-rotatably connected to the second branch 120 by means of a fifth torque transmission 140.

The lock-up clutch 70 has a clutch input side 145 and a clutch output side 150, wherein the clutch input side 145 is switchably connectable to the clutch output side 150. On the input side, the clutch input side 145 is connected to the first junction 115 by means of a sixth torque transmission 155.

The absorber device 80 can be designed as a torsion damper 85. The torsion damper 85 has at least one energy storage element 160. The energy storage element 160 is shown schematically as a bow spring in FIG. 1. The energy storage element 160 can also be designed differently and can be designed as a compression spring, for example.

Figure 2:
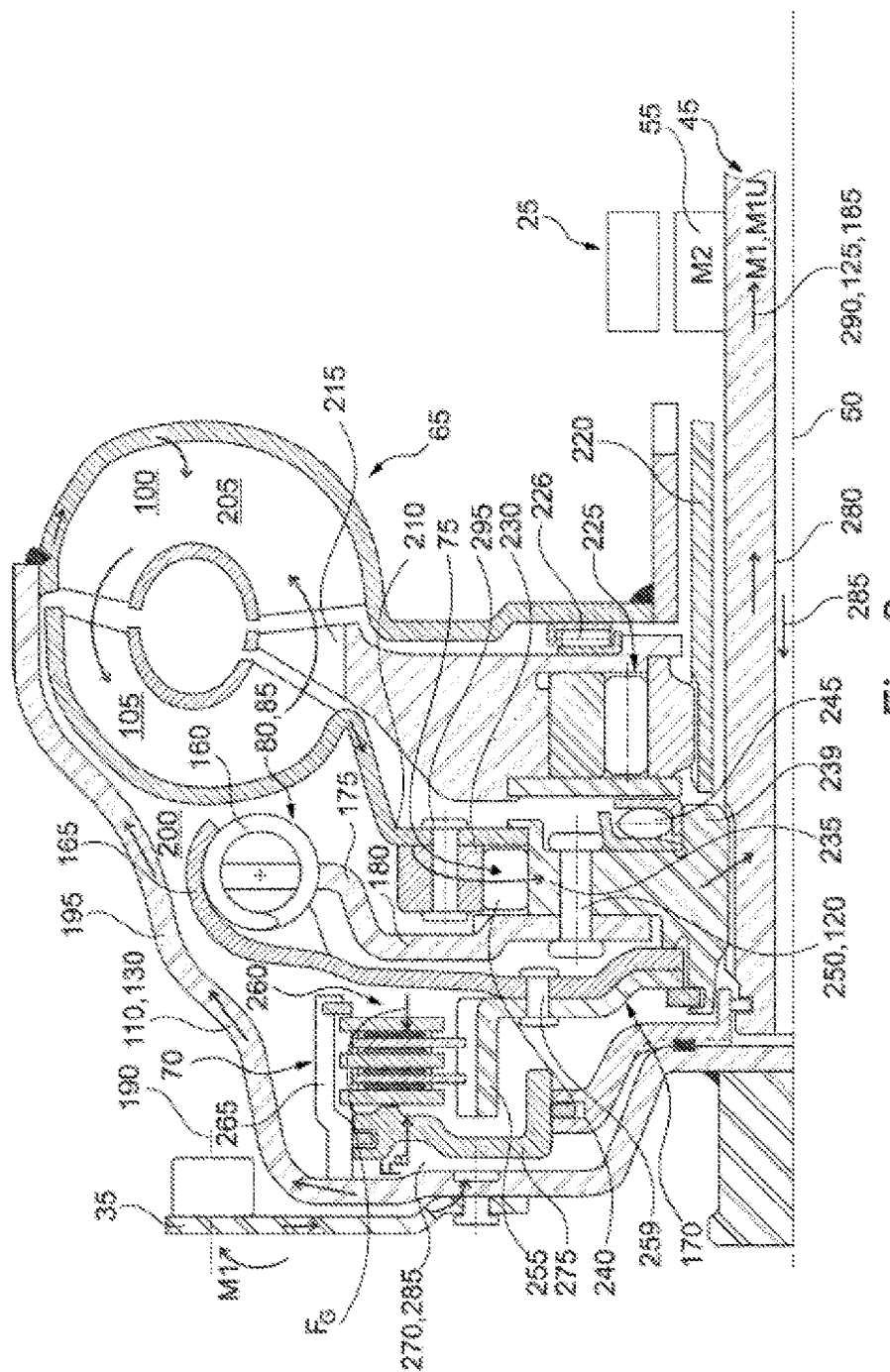
FIG. 2 shows a half longitudinal section through the drive train shown in FIG. 1.

On the input side, the energy storage element 160 is non-rotatably connected to the clutch output side 150 by means of an input part 165 of the torsion damper 85 shown in FIG. 2 by means of a seventh torque transmission 170. On the output side, the energy storage element 160 is non-rotatably connected to the second junction 120 by means of an output part 175 of the torsion damper 85 shown in FIG. 2 and an adjoining eighth torque transmission 180.

The second input side 40 is non-rotatably connected to the output side 45 by means of a ninth torque transmission 185.

The drive train 10 has a number of different operating states, which will be discussed below. Unless otherwise mentioned, the operating states relate only to forward travel of the motor vehicle, with which the motor vehicle is predominantly moved in the direction of travel.

In a first operating state, internal combustion engine 20 is activated and provides first torque M1 at first speed n1. The first operating state is essentially carried out when the motor vehicle starts up.

The first torque M1 is introduced into the first input side 35 at the first speed n1. In the first operating state, the motor vehicle starts up and the lock-up clutch 70 is open. The first torque M1 is transmitted to the first junction 115 via the first torque transmission 110. The first torque M1 in the first operating state is transmitted to the second branch 120 via the first torque transmission path 90 by the open lock-up clutch 70. In this case, the first torque M1 is transmitted via the impeller 100 and the turbine wheel 105 by means of a converter fluid, not shown in FIG. 1. A torque increase of the first torque M1 can occur at the turbine wheel 105, so that the turbine wheel 105 provides an excessive first torque M1U at the second speed n2. In the first operating state, the first input side 35 has a speed difference Δn from the second input side 40 between the first speed n1 and the second speed n2. The speed difference Δn is positive in the first operating state.

The freewheel 75 is designed such that when the speed difference falls below a predefined speed difference nv, it converts from the first freewheel operating state, in which the freewheel 75 connects the fourth torque transmission 135 to the fifth torque transmission 140 and thus connects the turbine wheel 105 to the second input side 40, to a second freewheel operating state. In the second freewheel operating state, the fourth torque transmission 135 is decoupled from the fifth torque transmission 140. The predefined speed difference nv can be 0, for example, or a negative value in a range from 0 up to and including a maximum second speed n2. In the idealized (considered friction-free) state of the freewheel 75, for example, the predefined speed nv=0.

In the case of a positive speed difference Δn, the speed difference does not fall below the predefined speed difference nv, so that the freewheel 75 is designed to transmit torque and the turbine wheel 105 is non-rotatably connected to the fifth torque transmission 140 for transmitting the excessive first torque M1U.

The first torque M1 is transmitted from the second junction 120 via the second torque transmission 125 to the second input side 40 and from the second input side 40 via the ninth torque transmission 185 to the output side 45 to drive the transmission unit 30. The second input side 40 rotates at the second speed n2, which is lower than the first speed n1. In the first operating state, the electric machine 25 is deactivated and does not provide a second torque M2. The electric machine 25 is also not switched to generator operation. In the ideal case considered to be friction-free, the first excessive torque M1U is present on the output side 45.

In a second operating state of the drive train 10, in which the motor vehicle is operated in purely electrical travel, the electric machine 25 is activated and the second torque M2 is provided on the rotor 55 by energizing the stator 60 with electric energy from an electric energy storage or an electric supply network, for example an overhead contact wire, ready. The second input side 40 rotates at the second speed n2. In the second operating state of the drive train 10, the motor vehicle 10 can be started, i.e., the second input side 40 is stationary and the second speed n2=0 at the beginning of the second operating state of the drive train 10.

Furthermore, in the second operating state, internal combustion engine 20 is deactivated (n1=0). The lock-up clutch 70 is open. When the motor vehicle is driving, the second speed n2 on the second input side is therefore greater than the first speed n1. The speed difference Δn=n1−n2 is negative and the predefined speed difference nv is undershot, so that the freewheel 75 is operated in the second freewheel operating state. In the second freewheel operating state, the freewheel 75 decouples the turbine wheel 105 or the fourth torque transmission 135 from the fifth torque transmission 140. As a result, the hydrodynamic converter 65 is essentially stationary, so that a drag torque for the electric machine 25 is essentially greatly reduced. Furthermore, unnecessary heating of the converter fluid in the hydrodynamic converter 65 is prevented.

The second operating state is also suitable for reversing the motor vehicle, in particular if the transmission unit 30 does not have a reverse gear. By decoupling the turbine wheel 105 from the second input side 40, the electric machine 25 can drive the output side 45 with a reverse direction of rotation to the direction of rotation of the first input side 35. As a result, the transmission device 30 can be designed in a particularly simple and cost-effective manner.

Furthermore, the internal combustion engine 20 can be activated in the second operating state. The internal combustion engine 20 drives the first input side 35 at the first speed n1. The first speed n1 is lower than the second speed n2, so that the differential speed Δn is negative and the predefined speed difference nv is undershot. As a result, the freewheel 75 is operated in the first freewheel operating state and the freewheel 75 decouples the turbine wheel 105 from the fourth torque transmission 135 and prevents part of the second torque M2 from being transmitted in the direction of the hydrodynamic converter 65 instead to the output side 45. In this operating mode, for example, the internal combustion engine 20 can drive additional units of the motor vehicle, for example an air conditioning system.

In a third operating state of the drive train 10, the drive train 10 is operated in the locked state. In the locked state, the lock-up clutch 70 is closed, so that the clutch input side 145 is connected to the clutch output side 150 in a torque-locking manner, preferably non-rotatably connected. Closing the lock-up clutch 70 deactivates the hydrodynamic converter 65, so that the impeller 100 has the same speed as the turbine wheel 105. Furthermore, in the third operating state, the internal combustion engine 20 is activated and provides the first torque M1 at the first speed n1. The first torque M1 is transmitted to the second torque transmission path 95 via the first torque transmission 110 and the first junction 115. A torque transmission essentially does not take place via the first torque transmission path 90. The first torque M1 is transmitted from the first junction 115 to the clutch input side 145 via the sixth torque transmission 155. The closed lock-up clutch 70 transmits the first torque M1 to the seventh torque transmission 170. The first torque M1 is introduced into the torsion damper 85, which eliminates rotational non-uniformities in the first torque M1 by means of the energy storage element 160. As a result, the first torque M1 is smoother on the output side than on the input side of the torsion damper 85 and is transmitted to the second junction 120 via the eighth torque transmission 180. The first torque M1 is transmitted from the second branch 120 to the second input side 40 via the second torque transmission 125. In the third operating state of the drive train 10, the electric machine 25 is deactivated, so that the second input side 40 rotates at the second speed n2, wherein the second speed n2 is equal to the first speed n1. The first torque M1 is transmitted from the second input side 40 to the output side 45 via the ninth torque transmission 185. The first torque M1 is introduced into the transmission unit 30 from the output side 45.

Due to the speed equality of the first input side 35 and the second input side 40, the freewheel 75 is coupled so that the impeller 100 rotates at the speed of the turbine wheel 105. This avoids additional drag losses within the hydrodynamic converter 65 in the third operating state. In the third operating state, the speed difference Δn between the first speed n1 and the second speed n2 is therefore equal to zero. In this case, the speed difference Δn does not fall below the predefined speed nv, but is equal to the predefined speed nv.

The freewheel 75 could also be operated in the second freewheel operating state instead of in the first freewheel operating state as described above, so that the turbine wheel 105 is decoupled from the second input side 40. In this operating state, the turbine wheel 105 is then dragged along by the impeller 100.

In a fourth operating state of the drive train 10, the electric machine 25 is switched to generator operation. Otherwise, the fourth operating state corresponds to the third operating state, wherein however the torque present on the output side 45 and transmitted to the transmission unit 30 is reduced by the second torque M2 with which the electric machine 25 uses electrical energy in generator mode. The second torque M2 thus acts against the first torque M1 on the second input side 40. In this case, internal combustion engine 20 drives both electric machine 25 and transmission unit 30 with first torque M1. The electrical energy storage device can be charged through generator operation.

In a fifth operating state, which essentially corresponds to the third operating state, the transmission unit 30 is driven both by the internal combustion engine 20 and by the electric machine 25, so that (essentially minus friction losses within the torque transmission unit 15) the two torques M1 and M2 act in the same direction on the output side 45.

FIG. 2 shows a half longitudinal section through the torque transmission unit 15 shown in FIG. 1.

The torque transmission unit 15 in FIG. 2 is designed in an exemplary embodiment. Another embodiment of the torque transmission unit 15 would also be conceivable.

The first input side 35 is shown on the left in FIG. 2. The first input side 35 is designed like a flange. The first input side 35 can be connected to a crankshaft flange of a crankshaft of the internal combustion engine 20 by means of a positive and/or non-positive connection 190.

The torque transmission unit 15 further has a housing 195. The housing 195 is non-rotatably connected on the left side to the first input side 35. The housing 195 defines a housing interior 200, wherein the housing interior 200 is at least partially filled with a converter fluid 205. In addition to the hydrodynamic converter 65, the freewheel 75, the torsion damper 85, and the lock-up clutch 70 are arranged in the housing interior 200.

The housing 195 non-rotatably connects the first input side 35 to the impeller 100. The housing 195 forms both the first torque transmission 110 and the first junction 115 and the third torque transmission 130.

The impeller 100 is arranged in FIG. 2 by way of example on an axial side facing away from the first input side 35. The turbine wheel 105 is arranged opposite the impeller 100 in the axial direction relative to the axis of rotation 50. The turbine wheel 105 has a turbine flange 210. For example, a guide wheel 215 is axially arranged between the impeller 100 and the turbine wheel 105 radially on the inside. The guide wheel 215 is mounted on a housing support 220 of the housing 195 and is supported on the housing support 220.

In addition, a further freewheel 225 can be arranged between the housing support 220 of the housing 195 and the guide wheel 215. The further freewheel 225 is supported radially on the inside on the housing support 220, and the further freewheel 225 is connected to the guide wheel 215 radially on the outside. In the axial direction, the impeller 100 is mounted on the guide wheel 215 in the axial direction by means of a first bearing arrangement 226.

The freewheel 75 is arranged radially on the inside of the turbine wheel 105. The freewheel 75 has an outer part 230 and at least one inner part 235, wherein the inner part 235 is connected to a hub 239. The hub 239 and the inner part 235 can be designed in one piece and of the same material. The guide wheel 215 is supported in the axial direction on the inner part 235 by means of a second bearing arrangement 245. The outer part 230 and the inner part 235 define a radial gap. At least one, preferably several, blocking bodies 240 are arranged in the radial gap. It is advantageous if the freewheel 75 is designed as a roller freewheel, clamp body-freewheel, wrap spring clutch or self-synchronizing clutch. In the embodiment, the blocking bodies 240 are designed as clamping bodies, for example.

The inner part 235 is connected to the output part 175 radially on the inside of the blocking body 240 by means of a first rivet connection 250, for example. The output part 175 thus forms the eighth torque transmission 180 and the first rivet connection 250 forms the second junction 120.

The energy storage element 160 is arranged radially on the outside of the freewheel 75 and is designed, for example, to radially overlap the freewheel 75. A radial overlap is understood to mean that when two components, for example energy storage element 160 and freewheel 75, are projected in the radial direction into a projection plane in which the axis of rotation 50 runs, the two components, for example the freewheel 75 and the energy storage element 160 cover in the projection plane.

The output part 175 and the input part 165 also assume a retainer function for fixing the energy storage element 160. The input part 165 is guided radially from the outside to the radial inside and ends radially on the inside approximately at the level of the inner part 235 of the freewheel 75.

At the radial height of the blocking body 240, the input part 165 is connected to an inner disk carrier 255 by means of a second rivet connection 259. Both the inner disk carrier 255 and the input part 165 together with the second rivet connection 259 form the seventh torque transmission 170. Furthermore, the inner disk carrier 255 forms the clutch output side 150.

The lock-up clutch 70 also has a friction pack 260 and an outer disk carrier 265, wherein the outer disk carrier 265 is arranged radially on the outside of the inner disk carrier 255. The outer disk carrier 265 forms a further radial gap with the inner disk carrier 255, wherein the friction pack 260 is arranged in the further radial gap. The outer disk carrier 265 forms the clutch input side 145 of the lock-up clutch 70 and is connected to the housing 195 at the end, for example, welded on.

For shifting the lock-up clutch 70, the lock-up clutch 70 has a pressure chamber 270 and a pressure piston 275, wherein the pressure chamber 270 is defined on one side by the housing 195 and by the pressure piston 275 opposite the housing 195. The pressure chamber 270 is defined radially on the outside by the outer disk carrier 265. The pressure piston 275 can be displaced in the axial direction, wherein the pressure piston 275 is able to bear against the friction pack 260. In the embodiment, the torque transmission unit 15 is designed as a three-channel converter, which means that a separate pressure channel 280 is provided for the control of the lock-up clutch 70. A pressurized fluid 285 can be fed into the pressure chamber 270 via the pressure channel 280 to introduce an actuating force $F_B$ into the friction pack 260 to generate a frictional connection in the friction pack 260 and to connect the outer disk carrier 265 to the inner disk carrier 255.

A transmission input shaft 290 is arranged radially on the inside parallel to the axis of rotation 50 as a hollow shaft. The transmission input shaft 290 forms the output side 45 on the right-hand side in FIG. 2. Furthermore, the transmission input shaft 290 forms the second and ninth torque transmission 125, 185 explained in FIG. 1. The rotor 55 of the electric machine 25 is fastened to the transmission input shaft 290 radially on the outside. For example, the electric machine 25 is arranged in the axial direction between the transmission unit 30 and the torque transmission unit 15. The pressure channel 280 can be arranged in the transmission input shaft 290 to provide the pressure fluid 285 from the transmission unit 30 for switching the lock-up clutch 70. The transmission input shaft 290 engages in a form-fitting manner in the hub 239 and is non-rotatably connected to the inner part 235 of the freewheel 75 via the hub 239 in a form-fitting manner.

The first operating state is shown symbolically in FIG. 2 by means of arrows. In the first operating state, the first torque M1 is introduced via the first input side 35 and is transmitted from the first input side 35 to the housing 195. The housing 195 drives the impeller 100 and the outer disk carrier 265. The lock-up clutch 70 is open. The impeller 100 drives the turbine wheel 105 via the converter fluid 205, wherein the first torque M1 is supported on the turbine wheel 105 with the excessive first torque M1U. The excessive first torque M1U is transmitted from the turbine wheel 105 on the turbine flange 210 to the outer part 230 via a third rivet connection 295. In the first operating state, the freewheel 75 is in the first freewheel operating state, so that the freewheel 75 is engaged and the first excessive torque M1U is transmitted from the outer part 230 via the blocking body 240 to the inner part 235. The excessive first torque M1U is transmitted to the transmission input shaft 290 by the engagement of the hub 239 in the transmission input shaft 290.

In the third to fifth operating state of the drive train 10, the second torque M2 can be introduced into the transmission input shaft 290 via the rotor 55 in addition to the transmitted first torque M1. In the third to fifth operating state of the torque transmission unit 15, the pressure fluid 285 is pressurized in the pressure chamber 270 and presses against the pressure piston 275 to provide the actuating force $F_B$. The actuating force $F_B$ braces the friction pack 260 with a counterforce $F_G$ acting against the actuating force $F_B$, so that a frictional connection is designed in the friction pack 260.

In the third to fifth operating states, the first torque M1 is passed from the housing 195 to the outer disk carrier 265. From there, the first torque M1 is transmitted to the inner disk carrier 255 via the frictional connection in the friction pack 260. The inner disk carrier 255 transmits the first torque M1 to the input part 165 via the second rivet connection 259. The input part 165 can be rotated relative to the output part 175 against the action of the energy storage element 160. For torque transmission, the energy storage element 160, which in the embodiment is designed as an arc spring, for example, is braced. The torsion damper 85 at least partially eliminates the rotational non-uniformity in the first torque M1. The first torque M1 is smoother on the output part 175 than on the input part 165. The first torque M1 is introduced into the inner part 235 of the freewheel 75 as a result of the coupling on the inside by means of the first rivet connection 250. The first torque M1 is transmitted from the inner part 235 to the transmission input shaft 290 via the hub 239.

In generator operation, the second torque M2 acts against the first torque M1 and thereby reduces the effect of the first torque M1 on the output side 45. If the electric machine 25 is activated and it provides the second torque M2, it acts on the transmission input shaft 290 in the same direction as the first torque M1.

LIST OF REFERENCE SYMBOLS

10 Drive train
15 Torque transmission unit
20 Internal combustion engine
25 Electric machine
30 Transmission unit
35 First input side
40 Second input side
45 Output side
50 Axis of rotation
51 Crankshaft
55 Rotor
60 Stator
65 Hydrodynamic converter
70 Lock-up clutch
75 Freewheel
80 Absorber device
85 Torsional vibration damper
90 First torque transmission path
95 Second torque transmission path
100 Impeller
105 Turbine wheel
110 First torque transmission
115 First junction
120 Second junction
125 Second torque transmission
130 Third torque transmission
135 Fourth torque transmission
140 Fifth torque transmission
145 Clutch input side
150 Clutch output side
155 Sixth torque transmission
160 Energy storage element
165 Input part
170 Seventh torque transmission
175 Output part 180 Eighth torque transmission
185 Ninth torque transmission
190 Connection
195 Housing
200 Housing interior
205 Converter fluid
210 Turbine flange
215 Guide wheel
220 Housing support
225 Further freewheel
226 First bearing arrangement
230 Outer part
235 Inner part
239 Hub
240 Blocking body
245 Second bearing arrangement
250 First rivet connection
255 Inner multiple disc carrier
259 Second rivet connection
260 Friction pack
265 Outer multiple disc carrier
270 Pressure chamber
275 Pressure piston
280 Press channel
285 Pressure fluid
290 Transmission input shaft
295 Third rivet connection
Δn Speed difference
FB Actuating force
M1 First torque transmission
M1U Excessive first torque
M2 Second torque transmission
n1 First speed
n2 Second speed
nv Predefined speed difference

The invention claimed is:

1. A torque transmission unit, comprising:
a first input side mounted rotatably about an axis of rotation, a second input side, an output side, a hydrodynamic converter, a lock-up clutch, and a freewheel;
the first input side being configured to receive a first torque;
the second input side being configured to receive a second torque; and
the lock-up clutch being arranged to be parallel to the hydrodynamic converter;
wherein the freewheel is downstream of the hydrodynamic converter, and the second input side is downstream of the freewheel in a torque flow of the first torque from the first input side to the output side;
wherein the freewheel is selectively operatable between a first freewheel operating state and a second freewheel operating state,
wherein the freewheel is designed to connect, in a torque-locking manner, the hydrodynamic converter to the output side in the first freewheel operating state of the freewheel to transmit the first torque from the first input side to the output side when the lock-up clutch is open;
wherein the freewheel is designed to decouple the hydrodynamic converter from the output side in the second freewheel operating state to at least partially prevent torque transmission of the second torque from the second input side to the hydrodynamic converter.

2. The torque transmission unit according to claim 1, wherein the freewheel is designed to be operated in the second freewheel operating state when a speed difference equals a predefined speed difference, and to be operated in the first freewheel operating state when the speed difference exceeds a predefined speed difference;
wherein the speed difference is determined from a first speed at which the input side is rotatably driven about the axis of rotation and a second speed at which the second input side is rotatably driven.

3. The torque transmission unit according to claim 1, wherein the freewheel is designed as a roller freewheel, a clamp body-freewheel, a wrap spring clutch or as a self-synchronizing clutch.

4. The torque transmission unit according to claim 1, wherein the hydrodynamic converter has a turbine wheel with a turbine flange;
wherein the freewheel has at least one body, an inner part arranged radially inside the blocking body, an outer part arranged radially outside of the inner part;
wherein the inner part and the outer part define an annular gap in the radial direction, in which the blocking body is arranged at least in sections;
wherein the blocking body is designed to release the outer part relative to the inner part in the second freewheel operating state and for the inner part to be connected, in a torque locking manner, to the outer part in the first freewheel operating state;
wherein the inner part is non-rotatably connected to the second input side and the outer part is non-rotatably connected to the turbine flange.

5. The torque transmission unit according to claim 4, further comprising signed to receive and provide a torque transmission to a transmission unit and an order device arranged in the torque flow of the first torque between the lock-up clutch and the second input side;
wherein the inner part is non-rotatably connected to the hub;
wherein the absorber device has an input part, an output part, and an energy storage element, and is designed to at least partially a sorb a rotational non-uniformity of the first torque;
wherein the input part is rotatable against action of the energy storage element relative to the output part;
wherein the output part is non-rotatably fastened to the hub.

6. The torque transmission unit, according to claim 1, further comprising at least one absorber device;
wherein the absorber device is arranged in the torque flow of the first torque between the lock-up clutch and the second input side- and is designed to at least partially absorb a rotational non-uniformity of the first torque.

7. The torque transmission unit according to claim 6, wherein the freewheel has a radial overlap with the absorber device at least in sections, the freewheel being arranged radially inside of the absorber device.

8. A drive train for a motor vehicle, comprising:
an internal combustion engine;
an electric machine;
transmission unit; and
a torque transmission unit including a first input side mounted rotatably about an axis of rotation, a second input side, an output side, a hydrodynamic converter, a lock-up clutch, and a freewheel,
the first input side being connected to the internal combustion engine in a torque-locking manner, a first to be introduced to the first input side via the internal combustion engine;

the second input side being connected to the electric machine in a torque-locking manner, a second torque being introduced to the second input side via the electric machine;

the output side being connected to the transmission unit in a torque-locking manner; and the lock-up clutch being parallel to e hydrodynamic converter;

wherein the freewheel is downstream of the hydrodynamic converter, and the second input side is downstream of the freewheel in a torque flow of the first torque from the first input side to the output side;

wherein the freewheel is selectively operatable between a first freewheel operating state and a second freewheel operating state, wherein the freewheel is designed to connect torque-locking manner, the hydrodynamic converter to the output side in the first freewheel operating state of the freewheel to transmit the first torque from the first input side to the output side when the lock-up clutch is open;

wherein the freewheel is designed to decouple the hydrodynamic converter from the output side in the second freewheel operating state to at least partially prevent torque transmission of the second torque from the second input side to the hydrodynamic converter.

9. The drive train according to claim 8, wherein in a further operating state of the drive train, the internal combustion engine is activated and provides the first torque on the first input side;

wherein, in the further operating state of the drive train, the electric machine-provides the second torque on the second input side, is switched to generator operation, or is deactivated;

wherein, in the further operating state of the drive train, the freewheel is operated in the first freewheel operating state and connects, in a torque-looking manner, the hydrodynamic converter to the second input side.

10. The drive train according to claim 9, wherein the lock-up clutch is open.

11. The drive train according to claim 9, wherein the lock-up clutch is closed.

12. The drive train according to claim 8, wherein, in an operating state of the drive train, the internal combustion engine is deactivated, the electric machine provides the second torque on the second input side, and the lock-up clutch is open;

wherein, in the operating state of the drive train, the freewheel is operated in the second freewheel operating state.

13. A method for operating a torque transmission unit comprising:

operating a first input side at a first speed;

introducing a torque into the torque transmission unit via a second input side, wherein the second input side is operated at a second speed that is sent from the first speed;

wherein a difference between the first speed and the second speed is smaller than a predefined speed difference;

wherein a lock-up clutch is open;

operating a freewheel in a freewheel operating state that at least partially interrupts a torque transmission of the torque from the second input side to a hydrodynamic converter;

wherein the torque is transmitted to an output side.

* * * * *